(12) United States Patent
Ellison et al.

(10) Patent No.: US 6,440,593 B2
(45) Date of Patent: Aug. 27, 2002

(54) MOLDED ARTICLE

(75) Inventors: Thomas M. Ellison, Fort Mill, SC (US); Arthur K. Delusky, Detroit, MI (US); Robert Lucke, Cincinnati, OH (US); Stephen P. McCarthy, Tyngsboro, MA (US)

(73) Assignee: The University of Massachusetts, Boston, MA (US)

( * ) Notice: Subject to any disclaimer, the term of this patent is extended or adjusted under 35 U.S.C. 154(b) by 51 days.

(21) Appl. No.: 09/775,416

(22) Filed: Feb. 1, 2001

Related U.S. Application Data

(63) Continuation-in-part of application No. 09/505,406, filed on Feb. 16, 2000, now abandoned.

(51) Int. Cl.$^7$ .................................................. H01B 5/10
(52) U.S. Cl. ........................ 428/931; 428/923; 428/925; 428/294.1; 428/332; 428/379; 428/374
(58) Field of Search ................................ 428/34.5, 373, 428/388, 929, 930, 931, 923, 925, 293.7, 294.1, 294.4, 295.4, 332, 379, 374

*Primary Examiner*—Merrick Dixon
(74) *Attorney, Agent, or Firm*—Bachman & LaPointe, P.C.

(57) ABSTRACT

A molded plastic article having improved electromagnetic interference (EMI) shielding properties. The article includes a plastic layer and an outer film layer over the plastic layer. The outer film layer has an inner surface adjacent to and bonded to the plastic layer and an outer surface opposed to the inner surface. The plastic layer and outer layer are electrically conductive. Preferably the outer layer has higher conductivity than the plastic layer.

21 Claims, 2 Drawing Sheets

MOLDED ARTICLE

CROSS-REFERENCE TO RELATED APPLICATION

This application is a Continuation-In-Part of U.S. patent application Ser. No. 09/505,406, filed Feb. 16, 2000, now abandoned.

BACKGROUND OF THE INVENTION

The use of plastic housings for electronic equipment and components is widespread in the automotive and electronic equipment fields as well as in other areas. However, plastic materials generally suffer from the disadvantage of being transparent or permeable to Electromagnetic Interference, commonly known as and referred to herein as "EMI". This disadvantage is of considerable concern in view of the susceptibility of electronic equipment to the adverse effects of EMI, and to the large and growing number of consumer products which produce EMI, as well as the increasing regulatory controls exercised over such electromagnetic pollution.

Present enclosure design approaches are reaching their electromagnetic interference shielding limits. The need to contain the extraordinary high-frequency EMI found in today's electronic equipment, coupled with the higher sensitivity of the equipment to EMI, has made enclosure design a more demanding task. For example, due to their smaller geometry, devices operating at higher frequencies are much more sensitive to EMI.

Plastic materials are highly desirable as materials of construction for cabinets used to house electronic equipment. They can be readily shaped and styled to make space saving, attractive enclosures. However, plastics are extremely poor electrical conductors and provide no EMI shielding unless highly modified.

One method of modifying the plastic is to paint its surface with a paint formulated with conductive material. However, such paints are labor intensive due to masking requirements and are prone to chipping and peeling and do not contribute to conductivity in the bulk of the plastic.

Alternatively, conductive filler such as carbon fiber or metal particles may be compounded into the plastic to be molded. These additives are expensive when used in sufficient quantity to achieve the desired volume resistivity (ohm-meter) necessary for EMI applications. In addition, the physical robustness of the structural plastic is significantly degraded at higher levels of conductive filler loading. Another EMI problem is potential loss of shielding effectiveness. This occurs as a consequence of RF leakage into or out of an enclosure along the interfacing surfaces between its outer low surface resistance film and its high volume resistivity inner plastic structure. The same effect can occur along the interfacing surfaces between the various conductive filler loaded molded parts of a multi-part EMI enclosure. The RF leakage is a consequence of the meniscus wetting characteristics of plastic that creates a thin insulating film along interface surfaces.

Accordingly, it is a principal object of the present invention to overcome the foregoing disadvantages and to provide a molded plastic article which has improved EMI shielding properties, e.g., no loss of physical robustness and enhanced RF shielding.

It is a further object of the present invention to provide a molded plastic article as aforesaid which is inexpensive and which may be simply, conveniently and expeditiously prepared.

Further objects and advantages of the present invention will appear hereinbelow.

SUMMARY OF THE INVENTION

In accordance with the present invention, the foregoing objects and advantages are readily obtained.

The molded plastic article of the present invention comprises: a plastic layer; an outer film layer over the plastic layer and forming a composite laminate therewith, the outer film layer having an inner surface adjacent to and bonded to the plastic layer, and an outer surface opposed to the inner surface; wherein the plastic layer and the outer film layer are both electrically conductive and reflect and/or adsorb electromagnetic interference. Preferably, the outer film layer will have lower surface resistance when compared to the plastic layer. In the preferred embodiment, the volume resistivity of the plastic layer ranges from about $3 \times 10^6$ to about $3 \times 10^2$ ohm-meter and the surface resistance of the outer film layer will be significantly less than the plastic layer and in the range from $10^1$ to $10^{-3}$ ohms/square.

The conductivity of the plastic layer is provided by incorporating either conductive fibers or conductive particles, and the outer film layer may also include conductive fibers or conductive particles, and may in addition include at least one of the following conductive materials: metal foil, metal mesh, carbon fiber, metallized film, metallized fiber and woven conductive fabric.

The molded plastic article of the present invention may include a third layer bonded to the plastic layer on the side thereof opposed to the outer film layer, wherein the third layer is desirably electrically conductive.

Further features of the present invention will appear hereinbelow.

BRIEF DESCRIPTION OF THE DRAWINGS

The present invention will be more readily understandable from a consideration of the accompanying drawings, wherein.

DETAILED DESCRIPTION OF PREFERRED EMBODIMENTS

Figure 1:
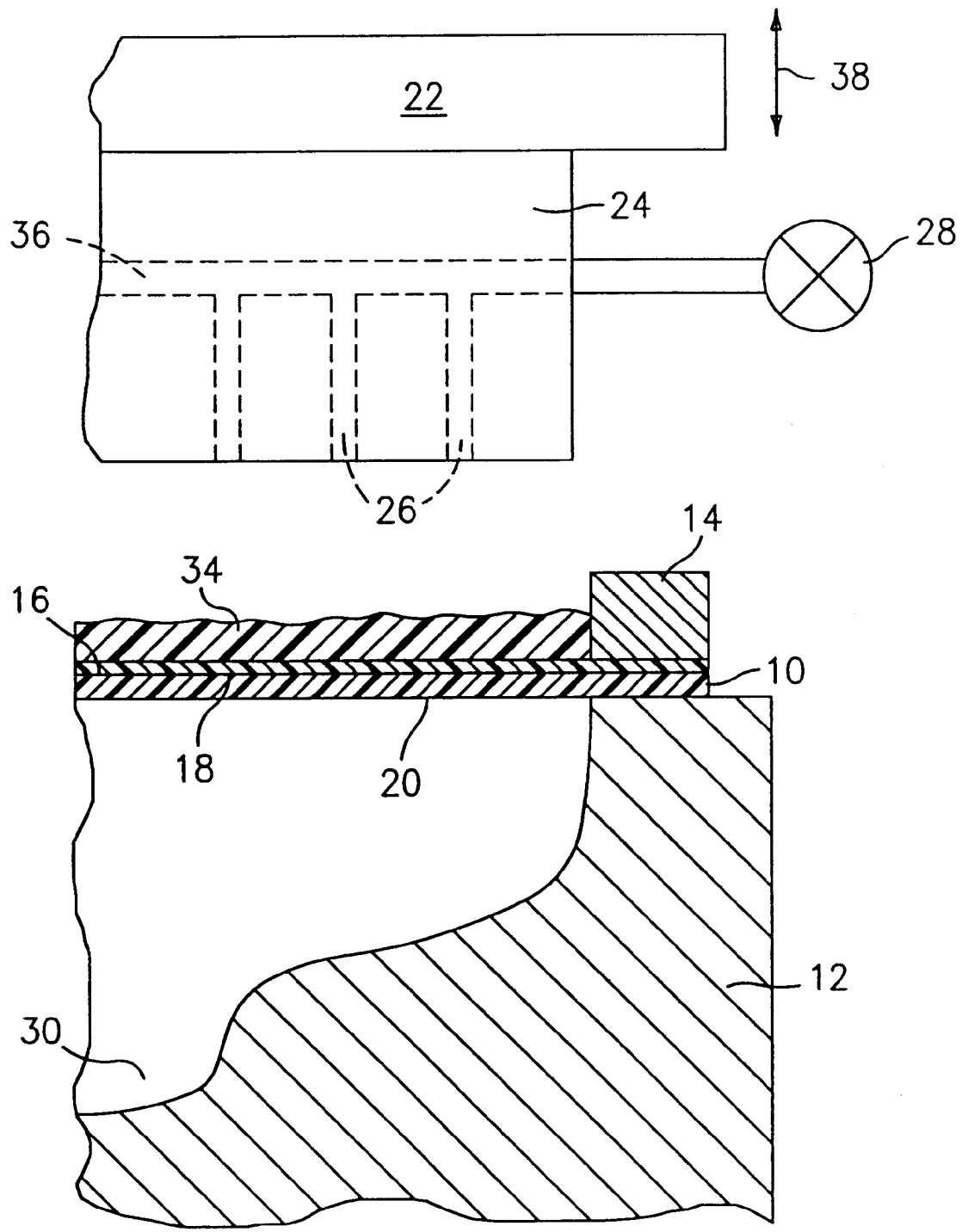
FIG. 1 is a partly schematic view showing one embodiment of the preparation of the molded article of the present invention.

EMI shielding is of growing importance in industry. EMI shielding is required to contain EMI emanating from sources such as electronic devices in the engine compartment of automobiles, or from high frequency devices used in today's information technology equipment. Conversely, shielding is also required to prevent extraneous EMI from adversely affecting the same sensitive electronic equipment and systems. The problem of EMI shielding is exacerbated by the growth in plastics used in automotive body parts and as enclosure material for electronic devices since plastics are in general insulators.

Plastic conductivity can be increased in several ways. For example, by compounding in conductive fillers, as carbon powder or stainless steel fiber. Alternatively, by the application of conductive coatings as layers to one or both surfaces, such as vacuum deposited metal, carbon fiber matte or metal foil or mesh. A still further alternative is to make the plastic out of polymers that are inherently conductive, such as polyaniline. While each of these methods improve conductivity, they are either very costly or in practice detract from the desirable performance properties of the plastic. For example, impact properties of plastics are reduced when conductive fillers, e.g., carbon powder or conductive fibers, are used in sufficient quantities to achieve effective shielding. Conductive surface layers are effective, but problems can occur with one side coating due to charge dissipation on the non-coated side or capacitance on two side coatings. Inherently, conductive polymers are expensive and do not always have the physical properties desired for a particular application.

The present invention overcomes these disadvantages and addresses the problems of cost increases and property degradation due to higher conductive filler loading while achieving levels of conductivity required for effective shielding.

Thus, in accordance with the present invention, conductive material is concentrated in at least one outer surface of the molded article while providing conductivity through the bulk of the article, with desirably less conductivity provided through the bulk than at the outer surface(s). Although the molded article may be obtained by any convenient method, in a preferred embodiment, a conductive film for the outer surface of the molded article is placed over a mold cavity, molten plastic containing a limited amount of conductive material is applied on the film, and the resultant composite is molded into the desired final shape by a mold core into a mold cavity. A typical and preferred procedure is found in copending U.S. patent application Ser. No. 09/130,864, filed Aug. 7, 1998 for PROCESS AND APPARATUS FOR PREPARING A MOLDED ARTICLE, By Valyi et al., the disclosure of which is incorporated herein by reference.

A conductive backing layer is optionally and preferably applied to the opposing side of the molten plastic to form a three-layer conductive laminate. Alternatively, the film finish or conductive outer film may be replaced with or combined with, for example, metal foil, perforated metal or woven metal screen or woven or non-woven carbon fiber sheet, with the metal or other sheet materials having sufficient formability for a given application. The same foil or other conductive material may if desired be used on the second or back surface of the molded. part.

The conductive material is incorporated into the plastic layer or the outer film surfaces may be metal, metallic particles, plastic or fibrous particles coated with metal as by vacuum deposition, or conductive carbonaceous material, as fibers, graphite particles, etc. A particularly desirable conductive material is a small carbon fiber having a very high length to thickness ratio. High conductivity is possible with this material at relatively low loadings. For appearance purposes, the conductive material may be incorporated into the outer films and/or into the plastic layer along with pigments and/or dyes to yield a desired finished appearance for the final molded article.

As a further alternative, a durable outer film layer such as polyvinyl chloride (PVC), polyvinylidiene fluoride (PVDF), polycarbonate (PC), polyester polymers and copolymers (PET/PBT), polyvinyl fluoride (PVF), acrylic, olefin polymers such as polypropylene (PP), polyethylene (PE) or their copolymers, acrylonitrile-butadiene-styrene (ABS) or other similar polymers and appropriate blends and copolymers of those named may be formulated with a high loading of conductive material as for example 5% to 30% by volume.

Alternatively, the outer film may be a laminate of a polymer filled with conductive additive and a metal mesh or conductive fiber mat or woven conductive fiber. In a further embodiment, the outer film may be metal mesh or conductive fibrous mat or conductive woven fiber. This outer film may have a thin coating, in the range of 0.0001" to about 0.05", applied to its outer surface to provide appearance and/or durability/weatherability.

The molding resin for the plastic layer is selected for its structural properties desired for the end use. It is compounded with the desired level of conductive material to provide the desired level of volume resistivity, generally about $10^6$ to $10^2$ ohm-meter and preferably with a higher resistivity than the outer layer(s). Thus, for example, the outer layer(s), if plastic, should desirably have from about 5% to 30% by volume of conductive material incorporated therein and a surface resistance of $10^1$ to $10^{-3}$ ohms per square. While the thicker inner plastic layer may have the same low volume resistivity range as the outer layer, to maintain structural robustness, it preferably has a much higher volume resistivity (in the range of from about $3\times10^6$ to $3\times10^2$ ohm meter). Thus, the level of conductive material loading is such that the desirable structural properties of the inner plastic layer are maintained while allowing a low level of conductivity throughout the plastic and/or plastic/film intra-structure to minimize electrostatic build-up and consequential Electrostatic Discharge (ESD). For example, ABS and an ABS/PC blends are good candidates for electrical housings. Candidates for the outer layer include polyvinyl chloride (PVC), polyvinylidiene fluoride (PVDF), polycarbonate (PC), polyester polymers and copolymers (PET/PBT), polyvinyl fluoride (PVF), acrylic, olefin polymers such as polypropylene (PP), polyethylene (PE) or their copolymers. Acrylonitrile-butadiene-styrene (ABS) or other polymers such as olefins or polyesters and appropriate blends and copolymers of those named are other candidates for the molding resin. Naturally, other suitable or desirable polymers may readily be employed.

If desired, a backing conductive layer may be used for the outer layer. If it is a continuous sheet, it may be perforated to facilitate air removal in the molding process. The backing sheet may also be a conductive scrim such as a non-woven carbon scrim or it may be a woven conductive fabric. Alternatively, the backing layer may be a metal foil, perforated metal or woven metal.

The conductive material for the outer layers and the plastic layer may be the same in each layer or they may be different in each layer.

In accordance with the illustrative embodiment of FIG. 1, film or blank 10 is held over mold 12 by clamping frame 14, with optional reinforcing material 16 adhered to or at least partly embedded in the inner face 18 of film 10. Outer face 20 of film 10 is opposed to the inner face and forms the external surface of the molded material in the embodiment of FIG. 1. Platen 22 is shown with a forming mandrel 24, which is desirably a solid metal mandrel, but which may also for example be an elastomeric mandrel, and which may contain air slots and pressure control means connected thereto (not shown). Mold 12 includes mold cavity 30 therein which forms the shape of the desired molded article 32 shown in FIG. 2. Naturally, any desired mold cavity shape may be used. Hot plastic 34. is injected or deposited on the film 10 reinforcing material 16 combination by any desired means, as from an extruder, to form the layered structure shown in FIG. 1.

Figure 2:
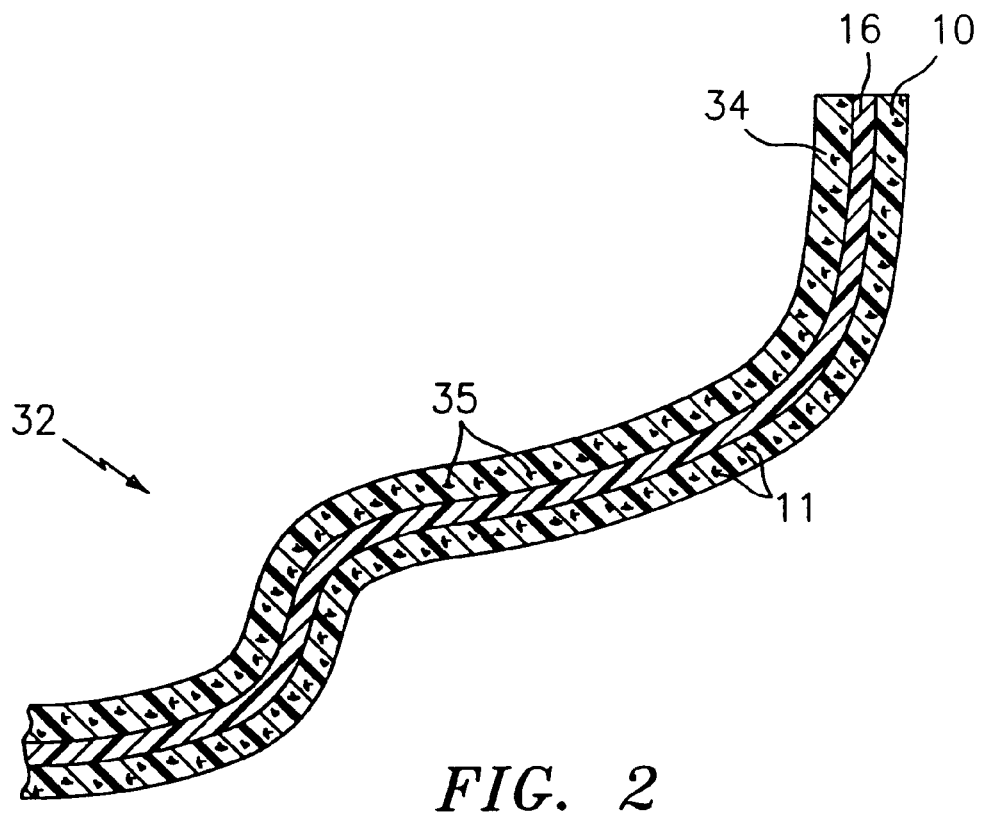
FIG. 2 is a sectional view of the article prepared in FIG. 1.

In operation, the mandrel 24 enters the clamping frame 14. Thereby, pressure is applied to the deposited plastic 34 and the film 10—reinforcing material combination. Pressure may also be present in mold cavity to support the layers over the mold before molding, as by air slots in mold 12 (not shown), which should be controllably released at the same time as the layers are formed into the mold cavity. This will result in forming the layers, in part by air pressure, into the molded article shown in FIG. 2. The mandrel 24 moves simultaneously downward into the mold cavity 30 in the direction of arrow 38. As the plastic and film reach the mold surface, the mandrel continues and conforms to the surface of the plastic away from the film 10—reinforcing material layers, and continued pressure by the platen results in forming of the final desired article, as shown in FIG. 2. The mandrel and mold are preferably cooled. If a solid mandrel is used, it should conform to the desired shape of the final article. If desired, the film-reinforcing material combination may first be conformed to the shape of mold cavity 30, mandrel 24 seated in mold 12 and plastic material 34 injected against the film-reinforcing material to form the final article.

The resultant molded article 32 includes the outer film layer 10 with conductive particles 11 dispersed therein, inner reinforcing layer 16 which may also contain conductive particles and which is adhered to and/or at least partly embedded in the outer film layer, and the inner plastic layer 34 with conductive particles 35 dispersed therein. The resultant molded article 32 has the desired shaped configuration determined by the shape of the mold cavity.

The film layer or blank 10 is desirably colored in order to form a color coated article in a simple and convenient manner.

Figure 3:
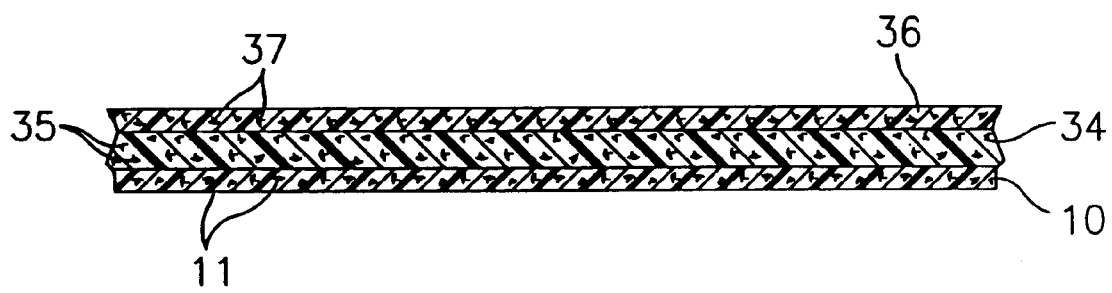
FIG. 3 shows a further embodiment of the present invention.

Desirably, a second outer film layer may be used over plastic layer 34 on the side opposed to the first outer film layer 10. This is shown in FIG. 3 without the optional reinforcing material. FIG. 3 shows first outer film layer 10 with conductive particles 11 dispersed therein, plastic layer 34 adhered thereto with conductive particles 34 dispersed therein and second outer film layer 36 with conductive particles 37 dispersed therein adhered to the plastic layer 34 on the side opposed to the first outer film layer. Naturally, a reinforcing layer may be used adjacent either or both of the outer film layers.

As indicated hereinabove, the conductive material is incorporated in the outer layer(s) and in the plastic layer to provide the conductive, multi-layer composite of the present invention.

The outer layers 10 and 36 are desirably plastic, and any desired plastic material may be used for the outer layers or molten plastic material 34, for example, polyolefins, polyurethanes, acrylonitrile butadiene styrene (ABS), polyvinyl chloride, polystyrene, polycarbonates, fluoropolymers, acrylic polymers, polyesters, blends of the foregoing, etc., and desirably blends of the foregoing. Layers 10, 34 and 36 may be the same or different materials. If the same materials are used, one can obtain melt bonding between the materials. If different materials are used, one can achieve a mechanical bond or an adhesive bondor through the use of an adhesive layer. The blank 10 may be cut or stamped from a web and a supply of blanks having the size and shape to fit over or into the mold cavity maintained adjacent the mold for transfer to the mold as needed.

If desired, a reinforcing material 16 may be adhered to and/or at least partly embedded in the inner surface of the film or blank in order to eliminate or significantly minimize the color thinning. Desirably, the reinforcing material is a textile material, synthetic or natural. However, one could readily use a fiberglass mat or scrim or a random fiberglass material, or metal or additional plastic. The metal should be a metal mesh or metal which will elongate or form under pressure. The fiberglass mat or scrim is desirably knitted. This will effectively reinforce the film without jeopardizing the color tones of the color-coated film and without interfering with the forming operation. The reinforcing material serves to distribute the elongating forces produced by the engagement with the most protruding areas of the-mold core. Thus, the entire film 10 is caused to elongate rather than the immediate area of contact. Accordingly, film thickness remains relatively uniform after the part is formed.

The blank may be applied to the mold with robot means or removably adhered to a carrier film strip. The carrier film strip may be provided with means to register the position of the blanks relative to the mold half onto which the blanks are to be placed, e.g., edge perforations. The carrier, with the blanks attached, may then be supplied from a roll. Once the blank and mold are juxtaposed, suction is applied to the edge of the blank by the mold, as through channels, sufficient to separate the blank from the carrier strip. Naturally, other transfer means may be readily be used.

Naturally, any other convenient or desirable plastic delivery means or molding procedure may conveniently be used while still retaining the advantages of the present invention, as for example alternative compression molding techniques, injection molding or injection blow molding.

Similarly, multiple plastic layers may be deposited on the film or the film-reinforcing material combination. Alternatively, one polymer could be deposited in a designed pattern, and a second or a plurality of second polymers deposited in a designed pattern. This could be done with one or more extruders feeding for example separate channels to deposit a predesigned pattern of multiple resins. As a further alternative, one could sequentially feed polymers of different characteristics to provide designed properties in the finished product.

Thus, in accordance with the present invention, a molded plastic article or panel is provided having a thermoplastic zone, a static dissipation zone (SDZ), formulated with conductive material or fillers, such as graphite fibrils, carbon fiber, stainless steel fibers or carbon powder. The amount of filler is minimized to limit the effect of filler on the physical properties of the plastic layer, to reduce cost in the case of carbon fiber and sufficient to provide for static dissipation but still well below that required for EMI and radio frequency (RF) shielding. The surface resistance of this zone is between about $10^9$ to about $10^5$ ohms per square. The SDZ may be molded into the article by for example compression, injection or extrusion molding.

A conductive surface zone (CSZ) on one or two sides is combined with the SDZ in forming the article. The CSZ may be plastic, metal foil, metal mesh, woven metal, carbon fiber mat, a blend of carbon or metal fibers with polymer fibers or polymer fibers having a vacuum deposited metal surface or combinations of these. Naturally, if a plastic is used, it should include the desired amount of conductive filler. The surface resistance (ohm/square) of the CSZ is desirably from $10^1$ to $10^{-3}$ ohms/square.

The present invention will be more readily understandable from a consideration of the following illustrative examples.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A molded plastic article, which comprises:

a plastic layer;

an outer film layer over said plastic layer and forming a composite laminate therewith, said outer film layer having an inner surface adjacent to and bonded to said plastic layer, and an outer surface opposed to said inner surface;

wherein said plastic layer and said outer layer are electrically conductive to provide resistance to electromagnetic interference, and wherein the plastic layer has a higher resistivity than the outer layer.

2. Article according to claim 1, wherein the plastic layer and outer film layer include conductive material incorporated therein.

3. Article according to claim 1, wherein the conductivity of the plastic layer is provided by incorporating therein at least one of conductive fibers and conductive particles.

4. Article according to claim 1, Wherein the outer film layer includes at least one of the following conductive materials: conductive fibers, conductive particles, metal foil, metal mesh, carbon fiber, metallized film, metallized fiber and woven conductive fabric.

5. Article according to claim 1, including a third layer bonded to said plastic layer on the side thereof opposed to said outer film layer.

6. Article according to claim 5, wherein said third layer is electrically conductive.

7. Article according to claim 5, wherein the conductivity of the third layer is provided by incorporating therein at least one of conductive fibers and conductive particles.

8. Article according to claim 3, wherein plastic layer includes carbon fibrils as conductive fibers, said fibrils having fiber lengths of from 1 to 10 microns.

9. Article according to claim 8, wherein the plastic layer includes 3–5% by weight of said carbon fibrils.

10. Article according to claim 1 wherein said article is compression molded.

11. Article according to claim 1, including a reinforcing layer between the outer film layer and plastic layer.

12. Article according to claim 1, wherein said outer film layer is colored.

13. Article according to claim 1, wherein said outer film layer is plastic.

14. Article according to claim 1, wherein said outer film layer has a colored topcoat.

15. Article according to claim 14, wherein said outer film has a clear coat on top of the colored topcoat.

16. Article according to claim 1, wherein the volume resistivity of the plastic layer ranges from $3\times10^6$ to $3\times10^2$ ohm meters.

17. Article according to claim 1, wherein the surface resistance of the outer layer is from $10^1$ to $10^{-3}$ ohms/square.

18. Article according to claim 1, wherein the surface resistance of the outer layer is at most $10^1$ ohms/square.

19. Article according to claim 1, wherein the volume resistivity of the plastic layer is at most $3\times10^6$ ohm meter.

20. Article according to claim 1, the surface resistance of the plastic layer is from $10^9$ to $10^5$ ohms per square.

21. Article according to claim 1, wherein the outer film layer is a laminate.

* * * * *